United States Patent
Corcoran et al.

(10) Patent No.: US 8,982,180 B2
(45) Date of Patent: Mar. 17, 2015

(54) FACE AND OTHER OBJECT DETECTION AND TRACKING IN OFF-CENTER PERIPHERAL REGIONS FOR NONLINEAR LENS GEOMETRIES

(75) Inventors: Peter Corcoran, Claregalway (IE); Petronel Bigioi, Galway (IE); Piotr Stec, Galway (IE)

(73) Assignee: Fotonation Limited, Ballybrit, Galway (IE)

( * ) Notice: Subject to any disclaimer, the term of this patent is extended or adjusted under 35 U.S.C. 154(b) by 405 days.

(21) Appl. No.: 13/078,971

(22) Filed: Apr. 2, 2011

(65) Prior Publication Data

US 2012/0249726 A1 Oct. 4, 2012

Related U.S. Application Data

(63) Continuation-in-part of application No. 13/077,936, filed on Mar. 31, 2011.

(51) Int. Cl.
| | |
|---|---|
| *H04N 7/00* | (2011.01) |
| *G06T 5/00* | (2006.01) |
| *G06T 3/00* | (2006.01) |
| *H04N 5/232* | (2006.01) |
| *G06T 7/20* | (2006.01) |

(52) U.S. Cl.
CPC .............. *G06T 5/006* (2013.01); *G06T 3/0062* (2013.01); *H04N 5/23219* (2013.01); *H04N 5/23238* (2013.01); *G06T 7/204* (2013.01); *G06T 2207/10016* (2013.01); *G06T 2207/30201* (2013.01)
USPC .......................................................... 348/36

(58) Field of Classification Search
USPC ........................................................... 348/36
See application file for complete search history.

(56) References Cited

U.S. PATENT DOCUMENTS

| | | | | |
|---|---|---|---|---|
| 5,000,549 | A | * | 3/1991 | Yamazaki ...................... 359/557 |
| 5,359,513 | A | * | 10/1994 | Kano et al. .................... 382/128 |
| 5,508,734 | A | | 4/1996 | Baker et al. |
| 5,526,045 | A | * | 6/1996 | Oshima et al. ............. 348/208.5 |
| 5,579,169 | A | * | 11/1996 | Mouri .......................... 359/682 |
| 5,585,966 | A | * | 12/1996 | Suzuki ......................... 359/557 |
| 5,633,756 | A | * | 5/1997 | Kaneda et al. ............... 359/554 |
| 5,675,380 | A | * | 10/1997 | Florent et al. ................ 348/251 |
| 5,960,108 | A | * | 9/1999 | Xiong .......................... 382/154 |
| 5,986,668 | A | * | 11/1999 | Szeliski et al. ............... 345/634 |

(Continued)

OTHER PUBLICATIONS

Brauer-Burchardt et al., A New Algorithm to Correct Fish-Eye- and Strong Wide-Angle-Lens-Distortion From Single Images, 2004, Friedrich Schiller University Jena, Department of Computer Science, pp. 1-4.*

(Continued)

*Primary Examiner* — Sath V Perungavoor
*Assistant Examiner* — Peter D Le
(74) *Attorney, Agent, or Firm* — Hickman Palermo Truong Becker Bingham Wong LLP

(57) ABSTRACT

A technique of enhancing a scene containing one or more off-center peripheral regions within an initial distorted image captured with a large field of view includes determining and extracting an off-center region of interest (hereinafter "ROI") within the image. Geometric correction is applied to reconstruct the off-center ROI into a rectangular or otherwise undistorted or less distorted frame of reference as a reconstructed ROI.

24 Claims, 9 Drawing Sheets

(4 of 9 Drawing Sheet(s) Filed in Color)

(56) References Cited

U.S. PATENT DOCUMENTS

| | | | |
|---|---|---|---|
| 6,035,072 A | 3/2000 | Read | |
| 6,078,701 A * | 6/2000 | Hsu et al. | 382/294 |
| 6,407,777 B1 | 6/2002 | DeLuca | |
| 6,664,956 B1 * | 12/2003 | Erdem | 345/419 |
| 7,042,505 B1 | 5/2006 | DeLuca | |
| 7,206,461 B2 | 4/2007 | Steinberg et al. | |
| 7,269,292 B2 | 9/2007 | Steinberg | |
| 7,295,233 B2 | 11/2007 | Steinberg et al. | |
| 7,308,156 B2 | 12/2007 | Steinberg et al. | |
| 7,310,450 B2 | 12/2007 | Steinberg et al. | |
| 7,315,630 B2 | 1/2008 | Steinberg et al. | |
| 7,315,631 B1 | 1/2008 | Corcoran et al. | |
| 7,315,658 B2 | 1/2008 | Steinberg et al. | |
| 7,317,815 B2 | 1/2008 | Steinberg et al. | |
| 7,336,821 B2 | 2/2008 | Ciuc et al. | |
| 7,340,109 B2 | 3/2008 | Steinberg et al. | |
| 7,352,394 B1 | 4/2008 | DeLuca et al. | |
| 7,362,368 B2 | 4/2008 | Steinberg et al. | |
| 7,369,712 B2 | 5/2008 | Steinberg et al. | |
| 7,403,643 B2 | 7/2008 | Ianculescu et al. | |
| 7,424,170 B2 | 9/2008 | Steinberg et al. | |
| 7,436,998 B2 | 10/2008 | Steinberg et al. | |
| 7,440,593 B1 | 10/2008 | Steinberg et al. | |
| 7,460,694 B2 | 12/2008 | Corcoran et al. | |
| 7,460,695 B2 | 12/2008 | Steinberg et al. | |
| 7,466,866 B2 | 12/2008 | Steinberg | |
| 7,469,055 B2 | 12/2008 | Corcoran et al. | |
| 7,469,071 B2 | 12/2008 | Drimbarean et al. | |
| 7,471,846 B2 | 12/2008 | Steinberg et al. | |
| 7,474,341 B2 | 1/2009 | DeLuca et al. | |
| 7,506,057 B2 | 3/2009 | Bigioi et al. | |
| 7,515,740 B2 | 4/2009 | Corcoran et al. | |
| 7,536,036 B2 | 5/2009 | Steinberg et al. | |
| 7,536,060 B2 | 5/2009 | Steinberg et al. | |
| 7,536,061 B2 | 5/2009 | Steinberg et al. | |
| 7,545,995 B2 | 6/2009 | Steinberg et al. | |
| 7,551,754 B2 | 6/2009 | Steinberg et al. | |
| 7,551,755 B1 | 6/2009 | Steinberg et al. | |
| 7,551,800 B2 | 6/2009 | Corcoran et al. | |
| 7,555,148 B1 | 6/2009 | Steinberg et al. | |
| 7,558,408 B1 | 7/2009 | Steinberg et al. | |
| 7,564,994 B1 | 7/2009 | Steinberg et al. | |
| 7,565,030 B2 | 7/2009 | Steinberg et al. | |
| 7,574,016 B2 | 8/2009 | Steinberg et al. | |
| 7,587,068 B1 | 9/2009 | Steinberg et al. | |
| 7,587,085 B2 | 9/2009 | Steinberg et al. | |
| 7,590,305 B2 | 9/2009 | Steinberg et al. | |
| 7,599,577 B2 | 10/2009 | Ciuc et al. | |
| 7,606,417 B2 | 10/2009 | Steinberg et al. | |
| 7,616,233 B2 | 11/2009 | Steinberg et al. | |
| 7,619,665 B1 | 11/2009 | DeLuca | |
| 7,620,218 B2 | 11/2009 | Steinberg et al. | |
| 7,630,006 B2 | 12/2009 | DeLuca et al. | |
| 7,630,527 B2 | 12/2009 | Steinberg et al. | |
| 7,634,109 B2 | 12/2009 | Steinberg et al. | |
| 7,636,486 B2 | 12/2009 | Steinberg et al. | |
| 7,639,888 B2 | 12/2009 | Steinberg et al. | |
| 7,639,889 B2 | 12/2009 | Steinberg et al. | |
| 7,660,478 B2 | 2/2010 | Steinberg et al. | |
| 7,676,108 B2 | 3/2010 | Steinberg et al. | |
| 7,676,110 B2 | 3/2010 | Steinberg et al. | |
| 7,680,342 B2 | 3/2010 | Steinberg et al. | |
| 7,683,946 B2 | 3/2010 | Steinberg et al. | |
| 7,684,630 B2 | 3/2010 | Steinberg | |
| 7,685,341 B2 | 3/2010 | Steinberg et al. | |
| 7,689,009 B2 | 3/2010 | Corcoran et al. | |
| 7,692,696 B2 | 4/2010 | Steinberg et al. | |
| 7,693,311 B2 | 4/2010 | Steinberg et al. | |
| 7,694,048 B2 | 4/2010 | Steinberg et al. | |
| 7,697,778 B2 | 4/2010 | Steinberg et al. | |
| 7,702,136 B2 | 4/2010 | Steinberg et al. | |
| 7,702,236 B2 | 4/2010 | Steinberg et al. | |
| 7,715,597 B2 | 5/2010 | Costache et al. | |
| 7,738,015 B2 | 6/2010 | Steinberg et al. | |
| 7,747,596 B2 | 6/2010 | Bigioi et al. | |
| 7,773,118 B2 | 8/2010 | Florea et al. | |
| 7,787,022 B2 | 8/2010 | Steinberg et al. | |
| 7,792,335 B2 | 9/2010 | Steinberg et al. | |
| 7,792,970 B2 | 9/2010 | Bigioi et al. | |
| 7,796,816 B2 | 9/2010 | Steinberg et al. | |
| 7,796,822 B2 | 9/2010 | Steinberg et al. | |
| 7,804,531 B2 | 9/2010 | DeLuca et al. | |
| 7,804,983 B2 | 9/2010 | Steinberg et al. | |
| 7,809,162 B2 | 10/2010 | Steinberg et al. | |
| 7,822,234 B2 | 10/2010 | Steinberg et al. | |
| 7,822,235 B2 | 10/2010 | Steinberg et al. | |
| 7,844,076 B2 | 11/2010 | Corcoran et al. | |
| 7,844,135 B2 | 11/2010 | Steinberg et al. | |
| 7,847,839 B2 | 12/2010 | DeLuca et al. | |
| 7,847,840 B2 | 12/2010 | DeLuca et al. | |
| 7,848,548 B1 * | 12/2010 | Moon et al. | 382/118 |
| 7,848,549 B2 | 12/2010 | Steinberg et al. | |
| 7,852,384 B2 | 12/2010 | DeLuca et al. | |
| 7,853,043 B2 | 12/2010 | Steinberg et al. | |
| 7,855,737 B2 | 12/2010 | Petrescu et al. | |
| 7,860,274 B2 | 12/2010 | Steinberg et al. | |
| 7,864,990 B2 | 1/2011 | Corcoran et al. | |
| 7,865,036 B2 | 1/2011 | Ciuc et al. | |
| 7,868,922 B2 | 1/2011 | Ciuc et al. | |
| 7,869,628 B2 | 1/2011 | Corcoran et al. | |
| 7,907,793 B1 * | 3/2011 | Sandrew | 382/284 |
| 8,139,896 B1 * | 3/2012 | Ahiska et al. | 382/298 |
| 2002/0063802 A1 * | 5/2002 | Gullichsen et al. | 348/607 |
| 2002/0114536 A1 * | 8/2002 | Xiong et al. | 382/284 |
| 2003/0103063 A1 * | 6/2003 | Mojaver et al. | 345/647 |
| 2005/0031224 A1 | 2/2005 | Prilutsky et al. | |
| 2005/0140801 A1 | 6/2005 | Prilutsky et al. | |
| 2005/0196068 A1 | 9/2005 | Kawai | |
| 2006/0093238 A1 * | 5/2006 | Steinberg et al. | 382/275 |
| 2006/0182437 A1 | 8/2006 | Williams et al. | |
| 2006/0204034 A1 | 9/2006 | Steinberg et al. | |
| 2006/0268130 A1 | 11/2006 | Williams et al. | |
| 2007/0115371 A1 * | 5/2007 | Enomoto et al. | 348/222.1 |
| 2007/0147820 A1 | 6/2007 | Steinberg et al. | |
| 2007/0160307 A1 | 7/2007 | Steinberg et al. | |
| 2007/0206941 A1 * | 9/2007 | Maruyama et al. | 396/153 |
| 2007/0253638 A1 | 11/2007 | Steinberg et al. | |
| 2007/0269108 A1 | 11/2007 | Steinberg et al. | |
| 2007/0296833 A1 | 12/2007 | Corcoran et al. | |
| 2008/0013799 A1 | 1/2008 | Steinberg et al. | |
| 2008/0043121 A1 | 2/2008 | Prilutsky et al. | |
| 2008/0075385 A1 | 3/2008 | David et al. | |
| 2008/0112599 A1 | 5/2008 | Nanu et al. | |
| 2008/0143854 A1 | 6/2008 | Steinberg et al. | |
| 2008/0186389 A1 | 8/2008 | DeLuca et al. | |
| 2008/0205712 A1 | 8/2008 | Ionita et al. | |
| 2008/0219517 A1 | 9/2008 | Blonk et al. | |
| 2008/0219518 A1 | 9/2008 | Steinberg et al. | |
| 2008/0219581 A1 | 9/2008 | Albu et al. | |
| 2008/0232711 A1 | 9/2008 | Prilutsky et al. | |
| 2008/0240555 A1 | 10/2008 | Nanu et al. | |
| 2008/0266419 A1 | 10/2008 | Drimbarean et al. | |
| 2008/0267461 A1 | 10/2008 | Ianculescu et al. | |
| 2008/0292193 A1 | 11/2008 | Bigioi | |
| 2008/0309770 A1 | 12/2008 | Florea et al. | |
| 2008/0316327 A1 | 12/2008 | Steinberg et al. | |
| 2008/0316328 A1 | 12/2008 | Steinberg et al. | |
| 2008/0317357 A1 | 12/2008 | Steinberg et al. | |
| 2008/0317378 A1 | 12/2008 | Steinberg et al. | |
| 2008/0317379 A1 | 12/2008 | Steinberg et al. | |
| 2009/0002514 A1 | 1/2009 | Steinberg et al. | |
| 2009/0003708 A1 | 1/2009 | Steinberg et al. | |
| 2009/0021576 A1 | 1/2009 | Linder et al. | |
| 2009/0022422 A1 | 1/2009 | Sorek et al. | |
| 2009/0040342 A1 | 2/2009 | Drimbarean et al. | |
| 2009/0074323 A1 * | 3/2009 | Utsugi | 382/275 |
| 2009/0080713 A1 | 3/2009 | Bigioi et al. | |
| 2009/0080796 A1 | 3/2009 | Capata et al. | |
| 2009/0080797 A1 | 3/2009 | Nanu et al. | |
| 2009/0115915 A1 | 5/2009 | Steinberg et al. | |
| 2009/0167893 A1 | 7/2009 | Susanu et al. | |
| 2009/0179998 A1 | 7/2009 | Steinberg et al. | |
| 2009/0179999 A1 | 7/2009 | Albu et al. | |
| 2009/0180713 A1 * | 7/2009 | Bucha et al. | 382/300 |

(56) References Cited

U.S. PATENT DOCUMENTS

| | | |
|---|---|---|
| 2009/0185049 A1 | 7/2009 | Takahashi |
| 2009/0185753 A1 | 7/2009 | Albu et al. |
| 2009/0189997 A1 | 7/2009 | Stec et al. |
| 2009/0189998 A1 | 7/2009 | Nanu et al. |
| 2009/0196466 A1 | 8/2009 | Capata et al. |
| 2009/0220156 A1* | 9/2009 | Ito et al. ............... 382/201 |
| 2009/0238410 A1 | 9/2009 | Corcoran et al. |
| 2009/0238419 A1 | 9/2009 | Steinberg et al. |
| 2009/0263022 A1 | 10/2009 | Petrescu et al. |
| 2009/0303342 A1 | 12/2009 | Corcoran et al. |
| 2009/0303343 A1 | 12/2009 | Drimbarean et al. |
| 2009/0310828 A1* | 12/2009 | Kakadiaris et al. ........ 382/118 |
| 2010/0002071 A1* | 1/2010 | Ahiska ................. 348/36 |
| 2010/0014721 A1* | 1/2010 | Steinberg et al. ......... 382/118 |
| 2010/0026831 A1 | 2/2010 | Ciuc et al. |
| 2010/0026832 A1 | 2/2010 | Ciuc et al. |
| 2010/0026833 A1 | 2/2010 | Ciuc et al. |
| 2010/0033551 A1* | 2/2010 | Agarwala et al. ............ 348/36 |
| 2010/0039520 A1 | 2/2010 | Nanu et al. |
| 2010/0039525 A1 | 2/2010 | Steinberg et al. |
| 2010/0046837 A1* | 2/2010 | Boughorbel ............. 382/173 |
| 2010/0053362 A1 | 3/2010 | Nanu et al. |
| 2010/0053367 A1 | 3/2010 | Nanu et al. |
| 2010/0053368 A1 | 3/2010 | Nanu et al. |
| 2010/0054533 A1 | 3/2010 | Steinberg et al. |
| 2010/0054549 A1 | 3/2010 | Steinberg et al. |
| 2010/0054592 A1 | 3/2010 | Nanu et al. |
| 2010/0060727 A1 | 3/2010 | Steinberg et al. |
| 2010/0066822 A1* | 3/2010 | Steinberg et al. ............ 348/77 |
| 2010/0119172 A1* | 5/2010 | Yu et al. ............... 382/256 |
| 2010/0141786 A1 | 6/2010 | Bigioi et al. |
| 2010/0146165 A1 | 6/2010 | Steinberg et al. |
| 2010/0165140 A1 | 7/2010 | Steinberg |
| 2010/0165150 A1 | 7/2010 | Steinberg et al. |
| 2010/0182458 A1 | 7/2010 | Steinberg et al. |
| 2010/0194895 A1 | 8/2010 | Steinberg |
| 2010/0201826 A1 | 8/2010 | Steinberg et al. |
| 2010/0201827 A1 | 8/2010 | Steinberg et al. |
| 2010/0202707 A1 | 8/2010 | Costache |
| 2010/0215251 A1* | 8/2010 | Klein Gunnewiek et al. ............ 382/154 |
| 2010/0220899 A1 | 9/2010 | Steinberg et al. |
| 2010/0238309 A1 | 9/2010 | Florea et al. |
| 2010/0259622 A1 | 10/2010 | Steinberg et al. |
| 2010/0260414 A1 | 10/2010 | Ciuc |
| 2010/0271499 A1 | 10/2010 | Steinberg et al. |
| 2010/0272363 A1 | 10/2010 | Steinberg et al. |
| 2010/0295959 A1 | 11/2010 | Steinberg et al. |
| 2010/0321537 A1 | 12/2010 | Zamfir |
| 2010/0328486 A1 | 12/2010 | Steinberg et al. |
| 2010/0329582 A1 | 12/2010 | Albu et al. |
| 2011/0002506 A1 | 1/2011 | Ciuc et al. |
| 2011/0002545 A1 | 1/2011 | Steinberg et al. |
| 2011/0007174 A1 | 1/2011 | Bacivarov et al. |
| 2011/0013043 A1 | 1/2011 | Corcoran et al. |
| 2011/0013044 A1 | 1/2011 | Steinberg et al. |
| 2011/0025859 A1 | 2/2011 | Steinberg et al. |
| 2011/0025886 A1 | 2/2011 | Steinberg et al. |
| 2011/0026780 A1 | 2/2011 | Corcoran et al. |
| 2011/0033112 A1 | 2/2011 | Steinberg et al. |
| 2011/0050919 A1 | 3/2011 | Albu et al. |
| 2011/0050938 A1 | 3/2011 | Capata |
| 2011/0053654 A1 | 3/2011 | Petrescu et al. |
| 2011/0055354 A1 | 3/2011 | Bigioi et al. |
| 2011/0102553 A1 | 5/2011 | Corcoran et al. |
| 2011/0116720 A1* | 5/2011 | Gwak et al. ............ 382/224 |
| 2011/0298795 A1* | 12/2011 | Van Der Heijden et al. . 345/419 |

OTHER PUBLICATIONS

Co-pending U.S. Appl. No. 12/572,930, filed Oct. 2, 2009.
Co-pending U.S. Appl. No. 12/636,608, filed Dec. 11, 2009.
Co-pending U.S. Appl. No. 12/636,618, filed Dec. 11, 2009.
Co-pending U.S. Appl. No. 12/636,629, filed Dec. 11, 2009.
Co-pending U.S. Appl. No. 12/636,639, filed Dec. 11, 2009.
Co-pending U.S. Appl. No. 12/636,647, filed Dec. 11, 2009.
Co-pending U.S. Appl. No. 12/790,594, filed May 28, 2010.
Co-pending U.S. Appl. No. 12/825,280, filed Jun. 28, 2010.
Co-pending U.S. Appl. No. 12/944,701, filed Nov. 11, 2010.
Co-pending U.S. Appl. No. 12/959,089, filed Dec. 2, 2010.
Co-pending U.S. Appl. No. 12/959,137, filed Dec. 2, 2010.
Co-pending U.S. Appl. No. 12/959,151, filed Dec. 2, 2010.
Co-pending U.S. Appl. No. 12/959,320, filed Dec. 2, 2010.
Co-pending U.S. Appl. No. 13/020,805, filed Feb. 3, 2011.
Co-pending U.S. Appl. No. 13/077,891, filed Mar. 31, 2011.
Co-pending U.S. Appl. No. 13/077,936, filed Mar. 31, 2011.

* cited by examiner

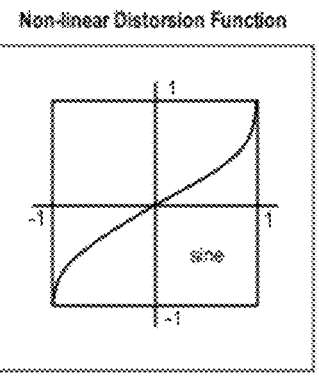
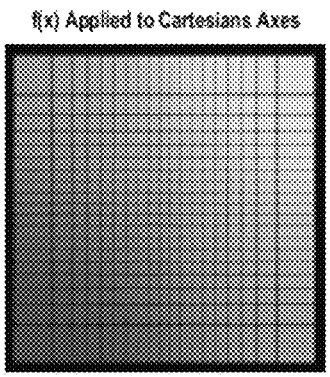
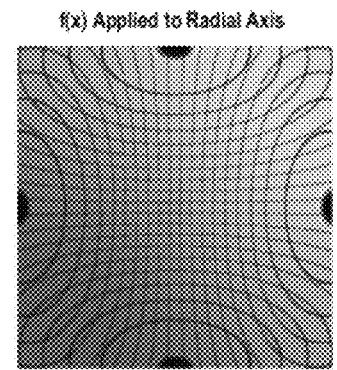
Figure 4A  Figure 4B  Figure 4C
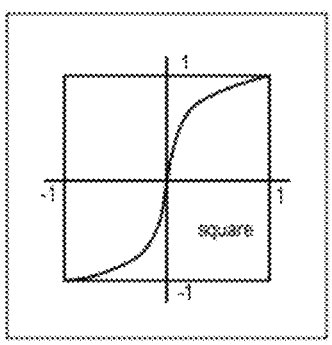
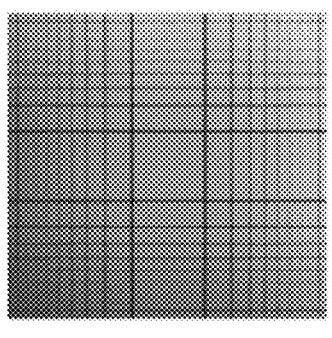
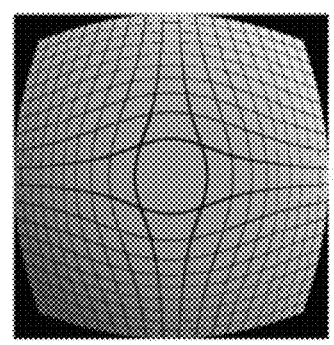
Figure 4D  Figure 4E  Figure 4F
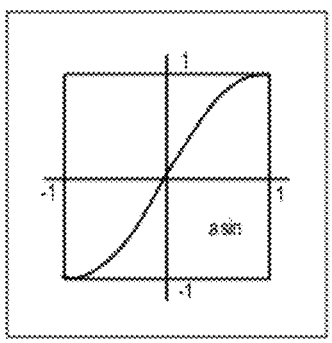
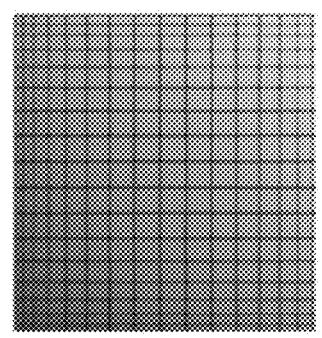
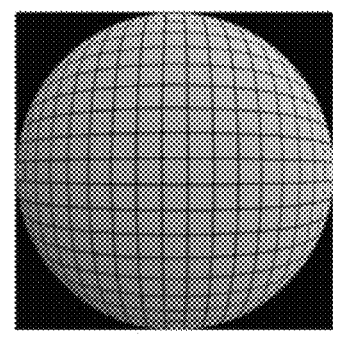
Figure 4G  Figure 4H  Figure 4I

FACE AND OTHER OBJECT DETECTION AND TRACKING IN OFF-CENTER PERIPHERAL REGIONS FOR NONLINEAR LENS GEOMETRIES

CROSS-REFERENCE TO RELATED APPLICATIONS

This application is a continuation-in-part (CIP) of U.S. patent application Ser. No. 13/077,936, filed Mar. 31, 2011. This application is also related to U.S. Ser. No. 13/077,891, also filed Mar. 31, 2011. This application is also related to U.S. Ser. Nos. 12/959,089, 12/959,137 and 12/959,151, each filed Dec. 2, 2010. All of these applications belong to the same assignee and are incorporated by reference. Another related application by the same assignee and same inventors, entitled FACE AND OTHER OBJECT TRACKING IN OFF-CENTER PERIPHERAL REGIONS FOR NONLINEAR LENS GEOMETRIES U.S. Ser. No. 13/078,970, is filed contemporaneously with the present application.

BACKGROUND

Images produced by a wide field of view lens vary in quality depending on the field angle. It is a physical limitation of such a lens.

Wide Field of View System

A WFOV, fish-eye or similar non-linear imaging system incorporates a lens assembly and a corresponding image sensor which is typically more elongated than a conventional image sensor. An indicative embodiment is provided in FIG. 1. The system may incorporate a face tracking module which employs one or more cascades of rectangular face classifiers.

Non-Linear Lens Geometries

An example expanded view of such a non-linear lens geometry is illustrated in FIG. 2. We note that some lens constructions can be modified to enhance the resolution of peripheral regions as described in U.S. Pat. No. 5,508,734 to Baker el al. However even with such modifications of the lens structure there is still a difference in resolution between the inner and outer regions of a non-linear lens when the imaged scene is projected onto the imaging sensor.

Distortion

Taking a typical lens to sensor mapping of a rectangular grid will yield a pattern similar to FIG. 3. FIG. 3 illustrates distortion of a rectangular pattern caused by a typical non-linear (fish-eye) lens. Other patterns exist as illustrated in FIGS. 4(a)-4(i). The radial distortion patterns are easier to manufacture and most lenses used in consumer imaging will exhibit one of the radial distortion patterns illustrated in FIGS. 3 and 4(a)-4(i). Image distortions may be corrected using various geometrical correction engines. These engines typically modify the pixels obtained at the sensor and transform them into a corrected rectangular grid. Such distortions may be corrected according to one particular application, which is to implement a variable electronic zoom by scaling the window of pixels used to reconstruct a rectangular image. FIG. 5 schematically illustrates two different windows used to build an x1 and x2.5 zoom image from the same set of underlying pixels data. Only the central pixels are used for the higher zoom 602a. FIG. 5 illustrates regions of an image sensor used to construct electronic zoom at ×1.0 (601a) and ×2.5 (602a) magnification.

Global Motion in Non-Linear Lens Geometries

Global motion can affect and induce errors in such an imaging system. This is illustrated in FIGS. 6 & 7(a)-7(b). US Patent application 2005/0196068 to Kawai details an improvement of such imaging systems to compensate for global motion and correct the geometrical corrections for camera motion during image acquisition. The imaging system of Kawai incorporates a vibration detecting subsystem but this could be replaced by various alternative motion detecting subsystems, including a frame-to-frame alignment engine operative solely on image data acquired in a video sequence. FIG. 6: Global motion (camera movement/handshake) lead to errors in geometrical correction; this will be more emphasized at higher focus factors. FIG. 7 illustrates motion vectors arising from global motion are more emphasized towards the center of a typical non-linear lens (RHS), whereas they are uniform across a conventional (linear) lens.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 4(a)-4(i) illustrate various non-linear distortion patterns for a rectangular grid mapped onto an imaging sensor.

DETAILED DESCRIPTIONS OF THE EMBODIMENTS

Figure 1:
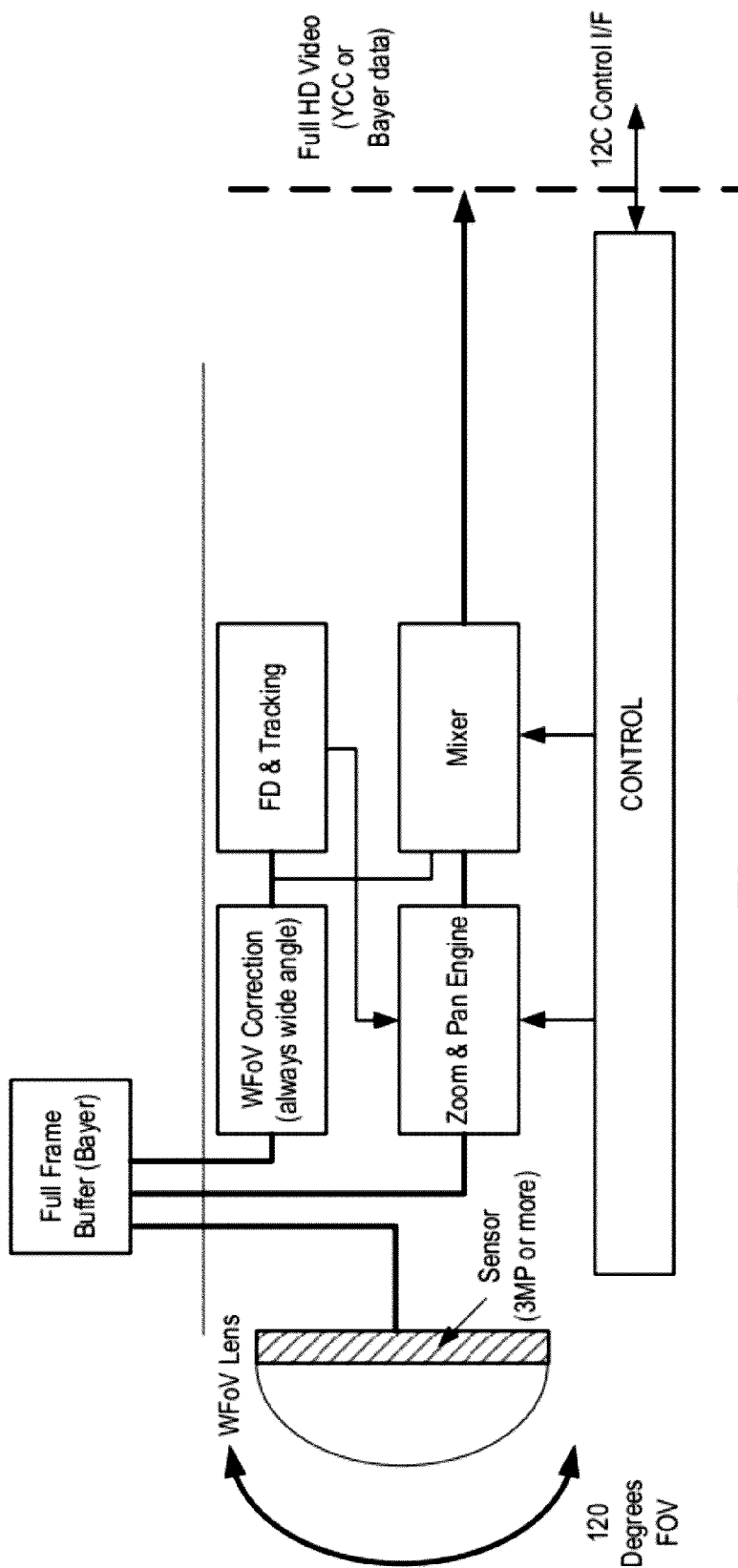
FIG. 1 illustrates a wide field of view (WFOV) system incorporating face-tracker.
Figure 2:
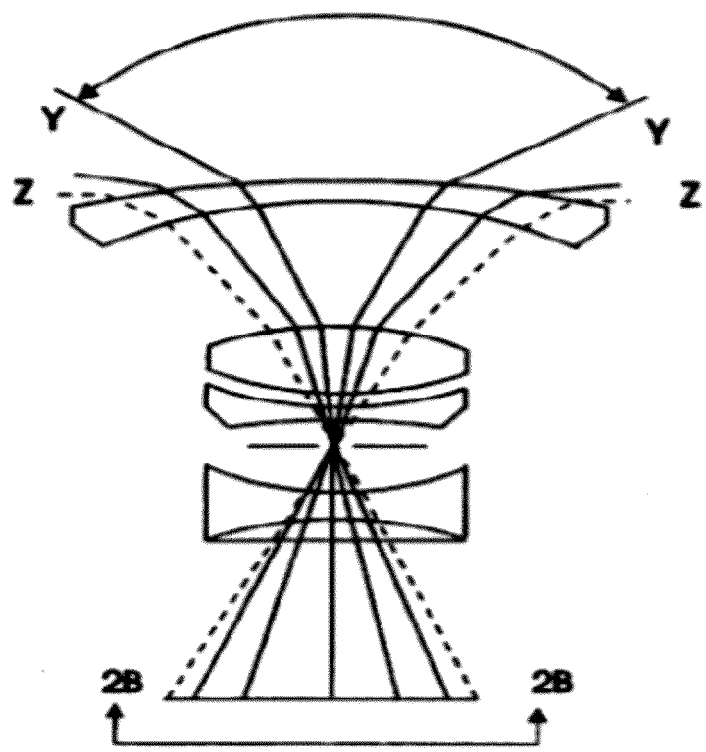
FIG. 2 illustrates an exploded diagram of a non-linear lens.

Within an image acquisition system comprising a non-linear, wide-angled lens and an imaging sensor, a method of enhancing a scene containing one or more off-center peripheral regions, a method is provided. An initial distorted image is acquired with a large field of view. The method includes determining and extracting an off-center region of interest (hereinafter "ROI") within said image. An initial object detection process is applied to the off-center ROI. Responsive to an initial determination of an object being detected within the off-center ROI, geometric correction is applied to reconstruct the off-center ROI into an approximately rectangular frame of reference as a first reconstructed ROI. Object tracking is applied to one or more regions within the first reconstructed ROI to refine the initial object detection process. A further action is performed based on a value of a parameter of the object tracked within the first reconstructed ROI.

The method may include compensating for global motion of the imaging device.

The parameter of the object may be or may include location.

A quality of reconstructed pixels may be determined within the first reconstructed ROI. The method may include electively applying image analysis to said reconstructed ROI based on the quality of the reconstructed pixels.

Responsive to the analysis and the pixel quality, the method may include selectively applying image enhancement and generating an enhanced output image.

The method may include determining if any undetected faces below a size threshold are likely to exist in one or more reduced quality regions of the reconstructed ROI. Responsive to the determining if any undetected faces exist, acquiring one or more additional initial distorted images, extracting and reconstructing one or more matching ROIs, and combining the one or more matching ROIs with reduced quality pixels of the original reconstructed ROI using a super-resolution technique, and generating, based on the combining, one or more enhanced ROIs. The method may include applying additional face detecting or tracking, or both, to the one or more enhanced ROIs to confirm a presence and location of a face below an original size threshold.

Within an image acquisition system comprising a non-linear, wide-angled lens and an imaging sensor, a method is provided to enhance a scene containing one or more off-center peripheral regions. An initial distorted image is acquired with a large field of view using a non-linear, wide-angled lens and imaging sensor. An off-center region of interest (hereinafter "ROI") is determined and extracted within the image. Geometric correction is applied to reconstruct the off-center ROI into an approximately rectangular frame of reference as a first reconstructed ROI. A quality of reconstructed pixels is determined within the first reconstructed ROI. Object tracking is applied to one or more regions within the first reconstructed ROI, respectively adapted to one or more local reconstructed pixel qualities within the one or more regions. The method also includes determining if undetected objects below a predetermined size threshold are likely to exist in one or more reduced quality regions of the first reconstructed ROI. Responsive to the determining if undetected objects exist, one or more additional initially distorted images are acquired, and the method includes extracting and reconstructing matching additional ROIs to combine with reduced quality pixels of the first reconstructed ROI to provide one or more enhanced ROIs. A further action is performed based on a value of a parameter of an object within the one or more enhanced ROIs.

The method may include using a super-resolution technique to generate at least one of the one or more enhanced ROIs.

The method may include applying additional object tracking to the enhanced ROI to confirm a location of a object below the predetermined size threshold.

The method may include compensating for global motion of the imaging device.

The parameter of the object may be or may include location.

Prior to the applying geometric correction, an initial object detection process may be applied to the off-center ROI. The applying geometric correction may be performed in response to an initial determination that an object exists within the off-center ROI. The object tracking may be applied to the reconstructed ROI to refine or confirm, or both, the initial object detection process.

A digital image acquisition device is also provided including a non-linear, wide-angled lens and an imaging sensor configured to capture digital images of scenes containing one or more off-center peripheral regions, including an initial distorted image with a large field of view, a processor, and a memory having code embedded therein for programming the processor to perform any of the methods described herein.

One or more non-transitory, processor-readable storage media is/are also provided having code embedded therein for programming a processor to perform any of the methods described herein.

Moreover, within a digital image acquisition system comprising a non-linear, wide-angled lens and an imaging sensor, a method is provided for enhancing a scene containing one or more off-center peripheral regions, including acquiring an initial distorted image with a large field of view, including using a non-linear, wide-angled lens and imaging sensor. The method includes determining and extracting an off-center region of interest (hereinafter "ROI") within said image. Geometric correction is applied to reconstruct the off-center ROI into a rectangular or otherwise undistorted or less distorted frame of reference as a reconstructed ROI. A quality of reconstructed pixels within said reconstructed ROI is determined. Image analysis is selectively applied to the reconstructed ROI based on the quality of the reconstructed pixels.

The method may include compensating for global motion of the image acquisition system.

The method may also include repeating the method for a second distorted image, and generating a second reconstructed ROI of approximately a same portion of an image scene as the first reconstructed ROI. Responsive to analysis of the first and second reconstructed ROIs, both the first and second reconstructed ROIs may be processed to generate an enhanced output image of substantially the same portion of the image scene.

The method may include, based on the selectively applying image analysis, adjusting an image acquisition parameter and repeating the method for a second distorted image, and generating, based on the second distorted image, a second reconstructed ROI of approximately a same portion of an image scene as the first reconstructed ROI. The first and second reconstructed ROIs of approximately the same portion of the image scene may be processed to generate, based on the processing, an enhanced output image of substantially the same portion of the image scene.

Responsive to the analysis and the pixel quality, image enhancement may be selectively applied to generate an enhanced output image.

A digital image acquisition device is also provided including a non-linear, wide-angled lens and an imaging sensor configured to capture digital images of scenes containing one or more off-center peripheral regions, including an initial distorted image with a large field of view, a processor, and a memory having code embedded therein for programming the processor to perform any of the methods described herein.

One or more non-transitory, processor-readable storage media having code embedded therein for programming a processor to perform any of the methods described herein.

In certain embodiments, the idea is to vary type and amount of image correction depending on the location of the source image as well as depending on a final projection of an image that was created by projecting the source image (partially or whole) to a new coordinate system.

ROI Sub-Regions in Non-Linear Lens Geometries

Figure 8A:
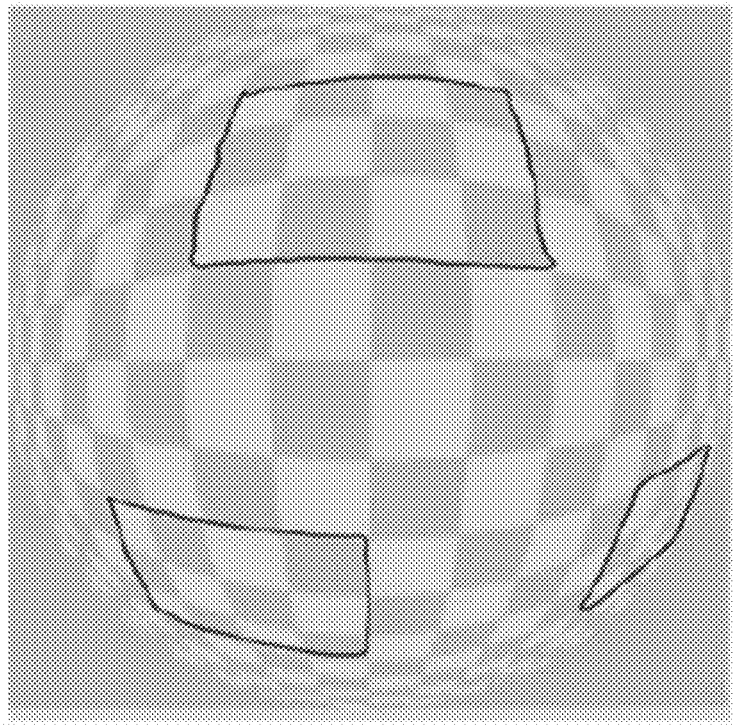
FIGS. 8(a) and 8(b) illustrate three different 4×3 ROIs within the FOV of the non-linear lens of (i) an exemplary fish-eye imaging system and (ii) an exemplary non-linear WFOV imaging system.
Figure 8B:
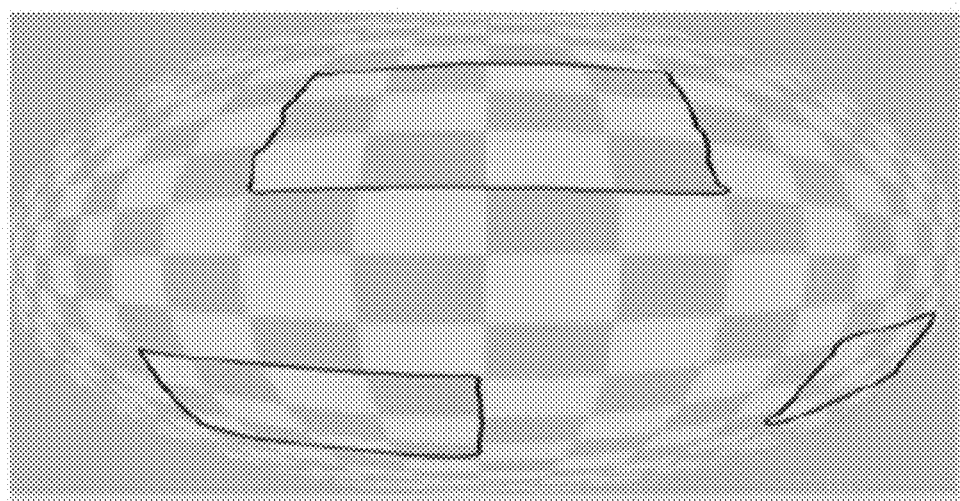

Now certain embodiments are configured to address a different problem, namely that of tracking faces in off-center portions of the imaged area based on a geometric correction engine and knowledge of one or more regions of interest (ROIs) within the overall field of view of the imaging system which contain or contains at least one face. An example of three different ROIs of similar 4×3 "real" dimensions is illustrated in FIGS. 8(a)-8(b). Considering that the underlying image sensor may be, for example, 3000×3000 pixels (9 Mpixel), then each of the regions illustrated in FIGS. 8(a)-8(b) would be typically resolved to either a VGA (640×480) or SVGA (800×600) pixel resolution. However, there will be a difficult non-linear mapping of the actual pixels which are useful to the final rectangular VGA, or SVGA image. While this mapping can be achieved using a geometric correction engine, given a knowledge of the location of the desired ROI, some pixels in the output VGA, or SVGA image frame may be re-constructed from better initial data than others.

In certain embodiments, it may be an effect of the geometric remapping of the image scene, or portions thereof, that the removal of purple fringes (due to blue shift) or the correction of chromatic aberrations may be desired. US published patent application no. US2009/0189997 is incorporated by reference as disclosing embodiments to detect and correct purple fringing and chromatic aberrations in digital images.

Figure 9:
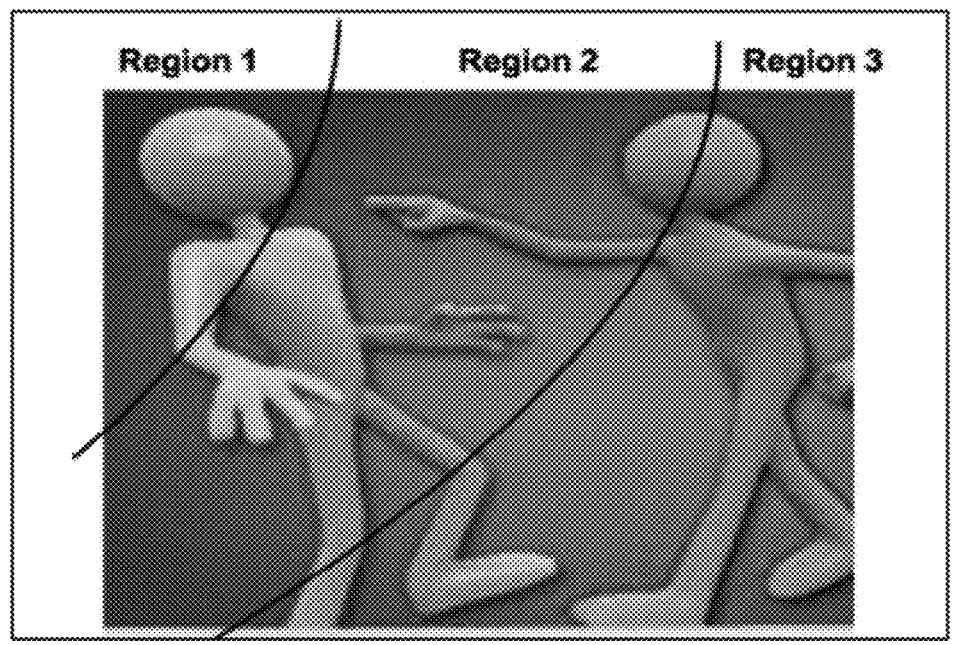
FIG. 9 illustrates an expanded image frame with different reconstructed image quality in the regions 1, 2, 3.

Referring now to FIG. 9, a reconstructed image with two persons included in the image scene is illustrated. Following the above discussion, different regions of this image will have different qualities of reconstructed pixels. In some cases the pixel values in a region are extrapolated based on a lower amount of data from the image sensor. As a generic measure, some pixels are described as having a reconstruction factor of greater than one. This implies that these pixels are reconstructed with at least the equivalent of more than one pixel of original data; while other pixels may have values less than unity implying that they are reconstructed from less than one pixel of original data.

Other factors may affect the quality of reconstruction. For example, regions with relatively homogeneous texture can be reconstructed with significantly less than 0.5 pixels of original data, whereas it may be desired for regions with substantial fine detail to use greater than 1.0 original pixel of equivalent data.

Figure 10:
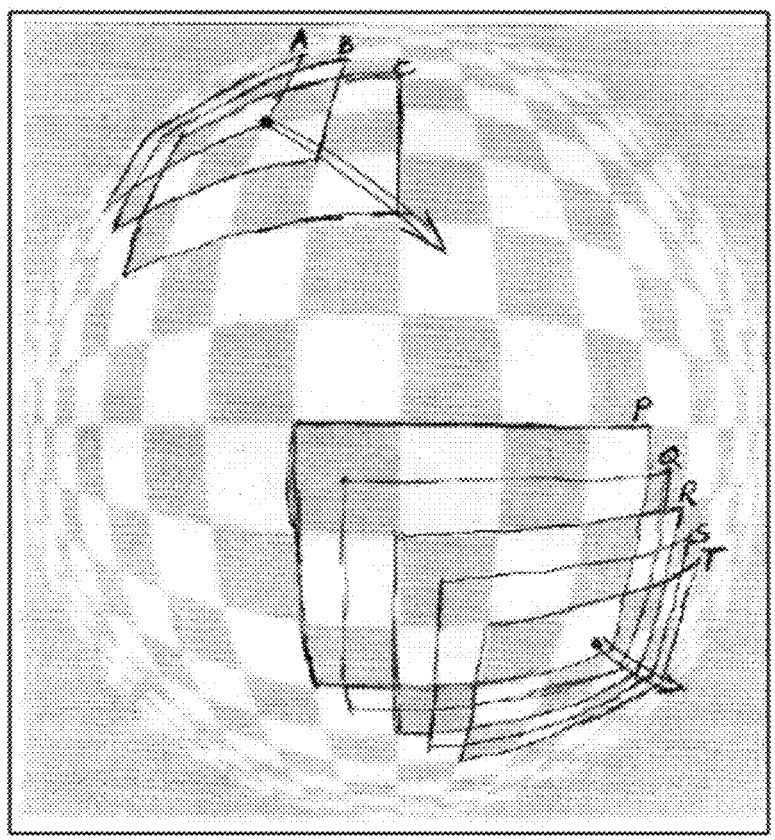
FIG. 10 Sequence of ROIs tracked across the imaging sensor acquired as a sequence of video frames.

In certain embodiments, a geometric reconstruction engine can provide information on the quality of areas of the image, or even at the level of individual pixels. In the example of FIG. 9, three regions are illustrated schematically. For the purposes of this illustrative, general example, these may be considered as representing pixels reconstructed with significantly more than 1.0 original pixels (Region 1, high quality—HQ); pixels reconstructed with the order of a single pixel (Region 2, normal quality—NQ) and pixels with significantly less than 1.0 original pixels (Region 3, reduced quality—RQ). In reconstructed images according to other embodiments, practically all pixels are HQ or NQ. However, towards the periphery of the sensor, there may be a significant proportion of the reconstructed image which is of reduced quality. In the example of FIG. 9, two face regions are illustrated. One face belongs to a blue man that is entirely within a HQ region. The second face belonging to the yellow man has a face region separated into two regions: one lying in a region of normal pixel quality, and the second lying in a region of reduced quality. FIG. 10 illustrates a sequence of ROIs tracked across an imaging sensor acquired as a sequence of video frames.

Wide Field of View Optical System

As a wide field of view (WFOV) optical system may be configured to image a horizontal field of >90-100 degrees or more, it may be desired to process the scene captured by the system to present an apparently "normal" perspective on the scene. There are several approaches to this as exemplified by the example drawn from the architectural perspective of a long building described in Appendix A. In the context of our WFOV camera this disclosure is primarily directed at considering how facial regions will be distorted by the WFOV perspective of this camera. One can consider such facial regions to suffer similar distortions to the frontage of the building illustrated in this attached Appendix. Thus the problem to obtain geometrically consistent face regions across the entire horizontal range of the WFOV camera is substantially similar to the architectural problem described therein.

Thus, in order to obtain reasonable face regions, it is useful to alter/map the raw image obtained from the original WFOV horizontal scene so that faces appear undistorted. Or in alternative embodiments face classifiers may be altered according to the location of the face regions within an unprocessed (raw) image of the scene.

In a first preferred embodiment the center region of the image representing up to 100' of the horizontal field of view (FOV) is mapped using a squeezed rectilinear projection. In a first embodiment this may be obtained using a suitable non-linear lens design to directly project the center region of the scene onto the middle ⅔ of the image sensor. The remaining approximately ⅓ portion of the image sensor (i.e. ⅙ at each end of the sensor) has the horizontal scene projected using a cylindrical mapping. Again in a first preferred embodiment the edges of the wide-angle lens are designed to optically effect said projection directly onto the imaging sensor.

Figure 11A:
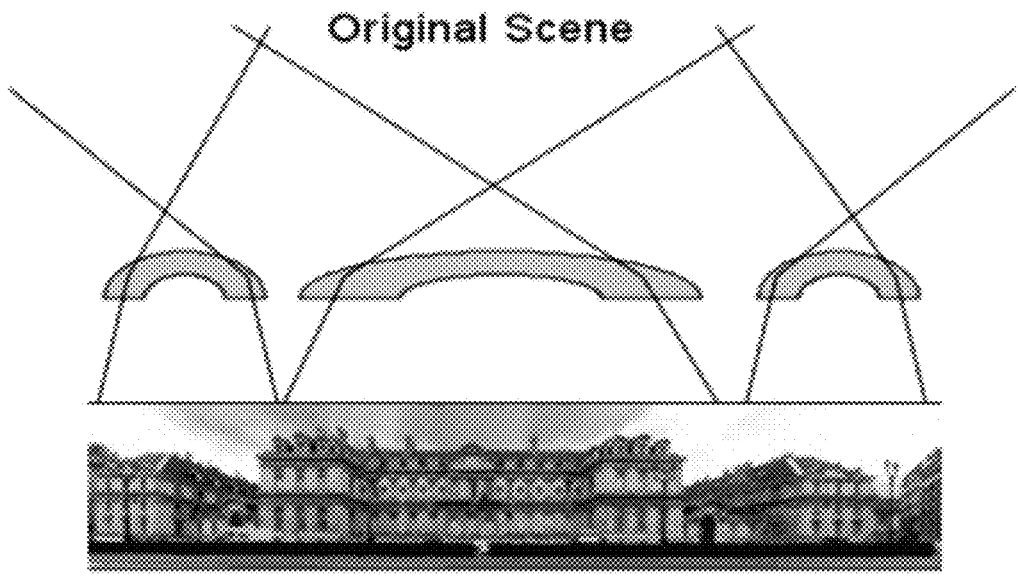
FIG. 11(a) illustrates a wide horizontal scene mapped onto a full extent of an image sensor.

Thus, in a first embodiment, the entire horizontal scene is mapped onto the full extent of the image sensor, as illustrated at FIG. 11(a).

Figure 11B:
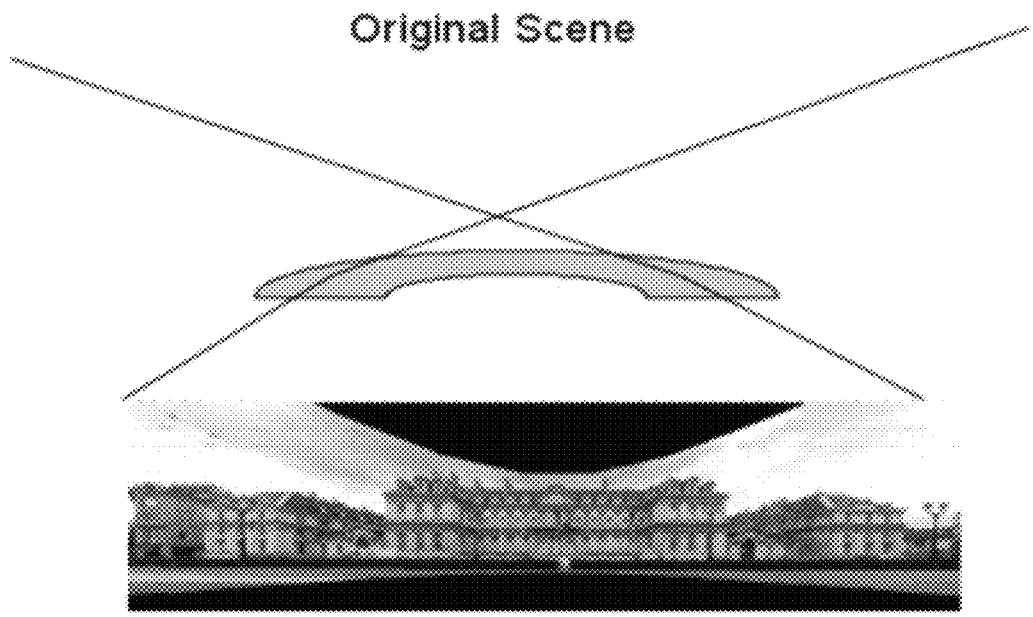
FIG. 11(b) illustrates a wide horizontal scene not mapped onto a full extent of an image sensor, and instead a significant portion of the sensor is not used.

Naturally the form and structure of such a complex hybrid optical lens may not be conducive to mass production thus in an alternative embodiment a more conventional rectilinear wide-angle lens is used and the squeezing of the middle ⅔ of the image is achieved by post-processing the sensor data. Similarly the cylindrical projections of the outer regions of the WFOV scene are performed by post processing. In this second embodiment the initial projection of the scene onto the sensor does not cover the full extent of the sensor and thus a significant portion of the sensor area does not contain useful data. The overall resolution of this second embodiment is reduced and a larger sensor would be used to achieve similar accuracy to the first embodiment, as illustrated at FIG. 11(b).

In a third embodiment some of the scene mappings are achieved optically, but some additional image post-processing is used to refine the initial projections of the image scene onto the sensor. In this embodiment the lens design can be optimized for manufacturing considerations, a larger portion of the sensor area can be used to capture useful scene data and the software post-processing overhead is similar to the pure software embodiment.

In a fourth embodiment multiple cameras are configured to cover overlapping portions of the desired field of view and the acquired images are combined into a single WFOV image in memory. These multiple cameras may be configured to have the same optical center, thus mitigating perspective related problems for foreground objects. In such an embodiment techniques employed in panorama imaging may be used advantageously to join images at their boundaries, or to determine the optimal join line where a significant region of image overlap is available. The following cases belong to the same assignee and relate to panorama imaging and are incorporated by reference: U.S. Ser. Nos. 12/636,608, 12/636,618, 12/636, 629, 12/636,639, and 12/636,647, as are US published apps nos. US2006/0182437, US2009/0022422, US2009/0021576 and US2006/0268130.

In one preferred embodiment of the multi-camera WFOV device three, or more standard cameras with a 60 degree FOV are combined to provide an overall horizontal WFOV of 120-150 degrees with an overlap of 15-30 degrees between cameras. The field of view for such a cameras can be extended horizontally by adding more cameras; it may be extended vertically by adding an identical array of 3 or more horizontally aligned cameras facing in a higher (or lower) vertical direction and with a similar vertical overlap of 15-30 degrees offering a vertical FOV of 90-105 degrees for two such WFOV arrays. The vertical FOV may be increased by adding further horizontally aligned cameras arrays. Such configurations have the advantage that all individual cameras can be conventional wafer-level cameras (WLC) which can be mass-produced.

Figure 3:
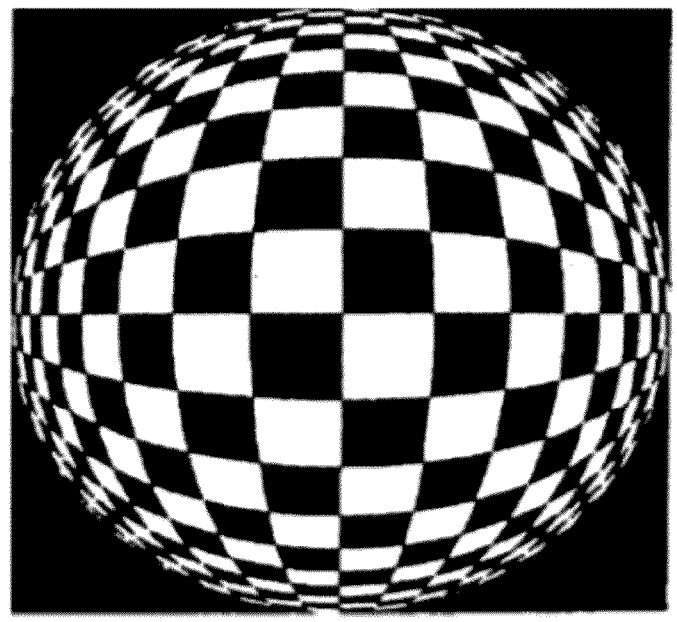
FIG. 3 illustrates distortion of a rectangular pattern caused by a typical non-linear (fish-eye) lens.
Figure 5:
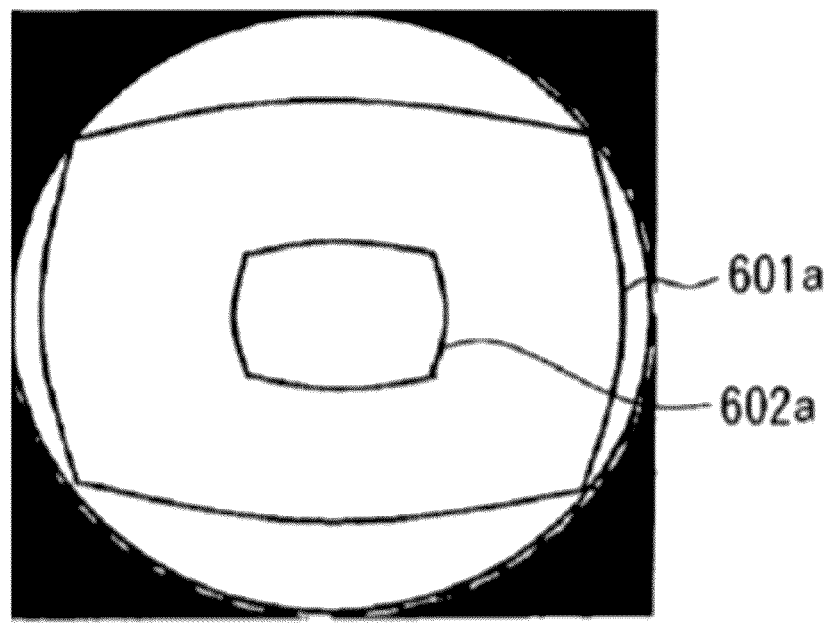
FIG. 5 illustrates regions of an image sensor used to construct electronic zoom at ×1.0 (601a) and ×2.5 (602a) magnification.
Figure 6:
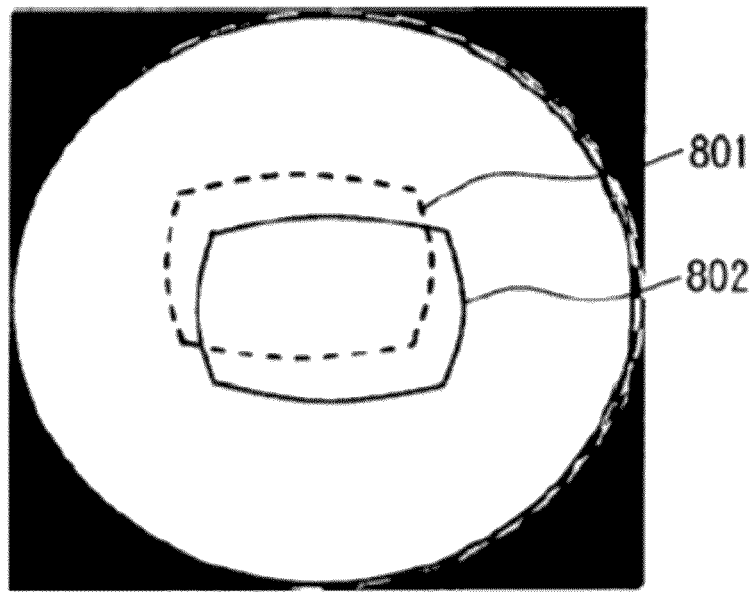
FIG. 6 illustrates global motion (camera movement/handshake) that tends to lead to errors in geometrical correction; this will be more emphasized at higher focus factors.

In an alternative multi-cameras embodiment a central WFOV cameras has its range extended by two side-cameras. The WFOV cameras can employ an optical lens optimized to provide a 120 degree compressed rectilinear mapping of the central scene. The side cameras can be optimized to provide a cylindrical mapping of the peripheral regions of the scene, thus providing a similar result to that obtained in FIG. 3(a), but using three independent cameras with independent optical systems rather than a single sensor/ISP as shown in FIG. 3(b). Again techniques employed in panorama imaging to join overlapping images can be advantageously used (see the Panorama cases referred to above herein).

After image acquisition and, depending on the embodiment, additional post-processing of the image, we arrive at a mapping of the image scene with three main regions. Over the middle third of the image there is a normal rectilinear mapping and the image is undistorted compared to a standard FOV image; over the next ⅓ of the image (i.e. ⅙ of image on either side) the rectilinear projection becomes increasingly squeezed as illustrated in FIGS. 1A-1G; finally, over the outer approximately ⅓ of the image a cylindrical projection, rather than rectilinear is applied.

FIG. 3(a) illustrates one embodiment where this can be achieved using a compressed rectilinear lens in the middle, surrounded by two cylindrical lenses on either side. In a practical embodiment all three lenses could be combined into a single lens structure designed to minimize distortions where the rectilinear projection of the original scene overlaps with the cylindrical projection.

A standard face-tracker can now be applied to the WFOV image as all face regions should be rendered in a relatively undistorted geometry. In alternative embodiments the entire scene need not be re-mapped, but instead only the luminance components are re-mapped and used to generate a geometrically undistorted integral image. Face classifiers are then applied to this integral image in order to detect faces. Once faces are detected those faces and their surrounding peripheral regions can be re-mapped on each frame, whereas it may be sufficient to re-map the entire scene background, which is assumed to be static, only occasionally, say every 60-120 image frames. In this way image processing and enhancement can be focussed on the people in the image scene.

In alternative embodiments it may not be desirable to completely re-map the entire WFOV scene due to the computational burden involved. In such embodiment, referring to U.S. Pat. Nos. 7,460,695, 7,403,643, 7,565,030, and 7,315,631 and US published app no. US2009/0263022, which are incorporated by reference along with US2009/0179998, US2009/0080713, US 2009/0303342 and U.S. Ser. No. 12/572,930, filed Oct. 2, 2009 by the same assignee. These references describe predicting face regions (determined from the previous several video frames). The images may be transformed using either cylindrical or squeezed rectilinear projection prior to applying a face tracker to the region. In such an embodiment, it may be involved from time to time to re-map a WFOV in order to make an initial determination of new faces within the WFOV image scene. However, after such initial determination only the region immediately surrounding each detected face need be re-mapped.

In certain embodiments, the remapping of the image scene, or portions thereof, involves the removal of purple fringes (due to blue shift) or the correction of chromatic aberrations. The following case belongs to the same assignee is incorporated by reference and relates to purple fringing and chromatic aberration correction: US2009/0189997.

In other embodiments a single mapping of the input image scene is used. If, for example, only a simple rectilinear mapping were applied across the entire image scene the edges of the image would be distorted and only across the middle 40% or so of the image can a conventional face tracker be used. Accordingly the rectangular classifiers of the face tracker are modified to take account of the scene mappings across the other 60% of image scene regions: Over the middle portion of the image they can be applied unaltered; over the second 30% they are selectively expanded or compressed in the horizontal direction to account for the degree of squeezing of the scene during the rectilinear mapping process. Finally, in the outer ⅓ the face classifiers are adapted to account for the cylindrical mapping used in this region of the image scene.

In order to transform standard rectangular classifiers of a particular size, say 32×32 pixels, it may be advantageous in some embodiments to increase the size of face classifiers to, for example, 64×64. This larger size of classifier would enable greater granularity, and thus improved accuracy in transforming normal classifiers to distorted ones. This comes at the expense of additional computational burden for the face tracker. However we note that face tracking technology is quite broadly adopted across the industry and is known as a robust and well optimized technology. Thus the trade off of increasing classifiers from 32×32 to 64×64 for such faces should not cause a significant delay on most camera or smartphone platforms. The advantage is that pre-existing classifier cascades can be re-used, rather than having to train new, distorted ones.

Having greater granularity for the classifiers is advantageous particularly when starting to rescale features inside the classifier individually, based on the distance to the optical center. In another embodiment, one can scale the whole 22×22 (this is a very good size for face classifiers) classifier with fixed dx,dy (computed as distance from the optical center). Having larger classifiers does not put excessive strain on the processing. Advantageously, it is opposite to that, because there are fewer scales to cover. In this case, the distance to subject is reduced.

In an alternative embodiment an initial, shortened chain of modified classifiers is applied to the raw image (i.e. without any rectilinear or cylindrical re-mapping). This chain is composed of some of the initial face classifiers from a normal face detection chain. These initial classifiers are also, typically, the most aggressive to eliminate non-faces from consideration. These also tend to be simpler in form and the first four Haar classifiers from the Viola-Jones cascade are illustrated in FIG. 4 (these may be implemented through a 22×22 pixel window in another embodiment).

Where a compressed rectilinear scaling would have been employed (as illustrated in FIG. 1F, it is relatively straightforward to invert this scaling and expand (or contract) these classifiers in the horizontal direction to compensate for the distortion of faces in the raw image scene. (In some embodiments where this distortion is cylindrical towards the edges of the scene then classifiers may need to be scaled both in horizontal and vertical directions). Further, it is possible from a knowledge of the location at which each classifier is to be applied and, optionally, the size of the detection window, to perform the scaling of these classifiers dynamically. Thus only the original classifiers have to be stored together with data on the required rectilinear compression factor in the horizontal direction. The latter can easily be achieved using a look-up table (LUT) which is specific to the lens used.

This short classifier chain is employed to obtain a set of potential face regions which may then be re-mapped (using, for example, compressed rectilinear compression and/or cylindrical mapping) to enable the remainder of a complete face detection classifier chain to be applied to each potential face region. This embodiment relies on the fact that 99.99% of non-face regions are eliminated by applying the first few face classifiers; thus a small number of potential face regions would be re-mapped rather than the entire image scene before applying a full face detection process.

In another embodiment, distortion may be compensated by a method that involves applying geometrical adjustments (function of distance to optical center) when an integral image is computed (in the cases where the template matching is done using II) or compensate for the distortion when computing the sub-sampled image used for face detection and face tracking (in the cases where template matching is done directly on Y data).

Note that face classifiers can be divided into symmetric and non-symmetric classifiers. In certain embodiments it may be advantageous to use split classifier chains. For example right and left-hand face detector cascades may report detection of a half-face region—this may indicate that a full face is present but the second half is more or less distorted than would be expected, perhaps because it is closer to or farther from the lens than is normal. In such cases a more relaxed half, or full-face detector may be employed to confirm if a full face is actually present or a lower acceptance threshold may be set for the current detector. The following related apps belong to the same assignee are incorporated by reference: US2007/0147820, US2010/0053368, US2008/0205712, US2009/0185753, US2008/0219517 and US2010/0054592, and U.S. Ser. No. 61/182,625, filed May 29, 2009 and U.S. Ser. No. 61/221,455, filed Jun. 29, 2009.

Scene Enhancements

In certain embodiments, a first image of a scene is reconstructed from sensor data. This first image is then analyzed using a variety of image analysis techniques and at least a second set of main image data is acquired and used to reconstruct at least a second image of substantially the same scene. The second image is then analyzed and the results of these at least two analyses are used to create an enhanced image of the original scene. Examples of various image analysis techniques include: (i) foreground/background separation; (ii) face detection and facial feature detection including partial or occluded faces or features and peripheral face regions; (iii) indoor/outdoor image classification; (iv) global luminance analysis; (v) local luminance analysis; (vi) directional luminance analysis; (vii) image blur analysis—global and local; (viii) image gradient analysis; (ix) color filtering & segmentation including color correlogram analysis; (x) image variance analysis; (xi) image texture filtering & segmentation.

The following belong to the same assignee as the present application and are incorporated by reference, particularly as describing alternative embodiments:

US published patent applications nos. 20110053654, 20110013044, 20110025886, 20110013043, 20110002545, 20100328486, 20110025859, 20100329549, 20110033112, 20110002506, 20110055354, 20100260414, 20110050919, 20110043648, 20100329582, 20110026780, 20100238309, 20110007174, 20100202707, 20100328472, 20100194895, 20100182458, 20100165140, 20100146165, 20100321537, 20100141798, 20100295959, 20100201826, 20100259622, 20100201827, 20100220899, 20100141787, 20100141786, 20100165150, 20100060727, 20100271499, 20100039525, 20100231727, 20100066822, 20100053368, 20100053367, 20100053362, 20100054592, 20090304278, 20100026833, 20100026832, 20100026831, 20100014721, 20090303343, 20090303342, 20090238419, 20090238410, 20100272363, 20090189998, 20090189997, 20090190803, 20090179999, 20090167893, 20090179998, 20090040342, 20090002514, 20090003661, 20100054549, 20100054533, 20100039520, 20080267461, 20080317379, 20080317339, 20090003708, 20080316328, 20080316327, 20080317357, 20080317378, 20080309769, 20090185753, 20080266419, 20090263022, 20080219518, 20080232711, 20080220750, 20080219517, 20080205712, 20080186389, 20090196466, 20080143854, 20090123063, 20080112599, 20090080713, 20090080797, 20090080796, 20080219581, 20080049970, 20080075385, 20090115915, 20080043121, 20080013799, 20080309770, 20080013798, 20070296833, 20080292193, 20070269108, 20070253638, 20070160307, 20080175481, 20080240555, 20060093238, 20050140801, 20050031224, and 20060204034; and U.S. Pat. Nos. 7,536,061, 7,683,946, 7,536,060, 7,746,385, 7,804,531, 7,847,840, 7,847,839, 7,697,778, 7,676,108, 7,620,218, 7,860,274, 7,848,549, 7,634,109, 7,809,162, 7,545,995, 7,855,737, 7,844,135, 7,864,990, 7,684,630, 7,869,628, 7,787,022, 7,822,235, 7,822,234, 7,796,816, 7,865,036, 7,796,822, 7,853,043, 7,551,800, 7,515,740, 7,466,866, 7,693,311, 7,702,136, 7,474,341, 7,460,695, 7,630,527, 7,469,055, 7,460,694, 7,403,643, 7,773,118, 7,852,384, 7,702,236, 7,336,821, 7,295,233, 7,469,071, 7,868,922, 7,660,478, 7,844,076, 7,315,631, 7,551,754, 7,804,983, 7,792,335, 7,680,342, 7,619,665, 7,692,696, 7,792,970, 7,599,577, 7,689,009, 7,587,085, 7,606,417, 7,747,596, 7,506,057, 7,685,341, 7,436,998, 7,694,048, 7,715,597, 7,565,030, 7,639,889, 7,636,486, 7,639,888, 7,536,036, 7,738,015, 7,590,305, 7,352,394, 7,551,755, 7,558,408, 7,587,068, 7,555,148, 7,564,994, 7,424,170, 7,340,109, 7,308,156, 7,310,450, 7,206,461, 7,369,712, 7,676,110, 7,315,658, 7,630,006, 7,362,368, 7,616,233, 7,315,630, 7,269,292, 7,471,846, 7,574,016, 7,440,593, 7,317,815, 7,042,505, 6,035,072, and 6,407,777.

U.S. patent application Ser. Nos. 13/077,936 and 13/077,891 are also incorporated by reference as disclosing alternative embodiments.

Face Detectors

In the following examples, embodiments involving a rectangular face detector will be described. However, the invention is not limited to detecting faces, and other objects may be detected, and such objects may also be tracked. Thus, where face detection or face tracking is mentioned herein, it is to be understood that the described features may be applied to objects other than faces. The face or other object detector may be based on variations of the Viola-Jones method where a cascade of rectangular classifiers is applied in sequence to a test region in the integral-image domain. Some approaches use a pass/fail cascade, while others employ a cumulative probability which allows the test region to fall below acceptance for some classifiers as long as it compensates by scoring above a threshold for the majority of the classifiers in the cascade.

Different types of classifiers may be used in a cascade. For example, one combination uses Haar-classifiers (see FIG. 12) for the initial stages and applies more granular Census-classifiers in the later stages of the cascade. Split cascades may be used where several short cascades are used to test for a predetermined condition, such as facial pose or directional lighting condition (see, e.g., US2008/0219517, incorporated by reference. One may also test for half-faces (see, e.g., U.S. Ser. Nos. 12/790,594 and 12/825,280, incorporated by reference. Face detection may be applied to images obtained from nonlinear cylindrical lenses or combinations. For lenses and techniques describing such systems and a range of embodiments, see U.S. Ser. No. 12/959,089, incorporated by reference.

Embodiments are described above and below herein involving face or other object detection in a portion of an image acquired with a nonlinear lens system. Typically the region of interest, or ROI, lies in the periphery of an ultra wide-angle lens such as a fish-eye with field of view, or FOV, of upwards of 180 degrees or greater. A geometric correction engine may be pre-calibrated for the particular lens in use.

In accordance with certain embodiments, a main image is acquired, and mapped onto an image sensor by a non-linear lens creating a distorted representation of the image scene. This distortion can be, for example, any of the types illustrated at FIGS. 3, 4(c), 4(f) or 4(i). A tracking system follows some activity or events within the main FOV and determines one or more regions of interest within that FOV. In certain embodiments, the tracking system includes either a face detector, a motion detector or a person detector, or other object detector such as a vehicle detector, animal detector or for sporting events a ball or racket detector may be used. In a home environment, hand or head detectors may be used to track gestures, e.g., on devices such as the Wii or the Playstation. Movement may simplify the tracking by providing an easily distinguished object, even in a distorted original image. In certain embodiments, a first original image frame may be processed by a geometric reconstruction engine to output the currently tracked ROI(s). A quality map of each reconstructed ROI is also provided.

As the full image frame is not processed, this is significantly faster than applying the engine to the entire acquired, distorted original image frame. This is highly advantageous for portable and even handheld devices, wherein efficient use of computational resources is at a premium.

Face Tracking after Applying the Geometric Correction Engine

In one embodiment, the relevant ROI is reconstructed from the main distorted image and regions of different quality are determined. A measure of reconstructed pixel quality may be available. The image is partitioned into a number of regions of differing quality. A number of face (or other object) detector cascades of varying granularity are also available. In one embodiment, several cascades of different sized classifiers are available e.g. 32×32, 24×24 and 14×14 pixel classifiers.

In an alternative, but related embodiment, a hardware resizing engine is used to upscale or downscale the ROI image to match with a fixed size face detector cascade, say 22×22 pixel, but having the same effect as applying different sizes of cascaded classifiers. See U.S. Pat. Nos. 7,460,695, 7,403,643 and 7,315,631, incorporated by reference, for detailed explanations of advantageous face detecting and tracking embodiments. Once a face (or other object) is detected, a history of that face may be recorded over a sequence of image frames and on each new frame acquisition a face candidate area is marked indicating a region of the frame where there is a very high probability of finding a face because a face was detected at or near the center of this region in the previous image frame, or some estimated movement distance from where it was detected in the previous frame. According to this embodiment, a face-detection/tracking process is next applied to the reconstructed ROI image. This process may be modified according to the determined pixel quality of different portions of the image. Thus in regions where the image quality is high quality, or HQ, and normal quality, or NQ, all three sizes of face detector may be used in the face detection/tracking process. However in regions of reduced quality, or RQ, there may typically not be sufficient pixel resolution to use the smaller size(s) of face classifier. The face detection/tracking process in accordance with certain embodiments determines these regions and understands not to apply smaller classifiers thus eliminating potential false positives and saving time.

A particular complication arises where a face region overlaps between two different regions of image quality as illustrated in FIG. 9, where the person on the right is partly in a NQ region and partly in a RQ region. To handle such cases the face detection/tracking process allows the detection window to overlap into the RQ region but applies a more relaxed thresholding or a shorter classifier chain to compensate for the possibility that the pixel quality/resolution in the RQ region may not be good enough to confirm a face region. In certain embodiments, the detection window will not be allowed to overlap more than 50% into the RQ region, although if the tracking process indicates the likelihood of a face region from a previous image frame, then it may extend up to 75% into that region. In alternative embodiments, face candidate areas within the HQ region may be reconstructed at a higher pixel resolution to enable more granular (smaller) face detectors to be applied if the face history indicates the person is moving into the background.

Face Tracking without on-Demand Superresolution Enhancement

In certain embodiments, the smaller sizes of face detector will not be applied to the RQ (reduced quality) regions of the image. However, in other embodiments, (i) the device determines whether a tracked object region is likely to have moved into a RQ region of the image, and (ii) the device determines whether a new face of small size is likely to have entered the image frame. If neither of these applies, then in certain embodiments the RQ region will not be searched and no action will be taken.

If, however, the tracking history, or some knowledge of the region appearing in the RQ portion of the image (e.g., that a door is located in that area) suggests that it is desirable to search in this region, then the face or other object detection module and/or face or other object tracking module may be used to initiate enhancement of the RQ portions of the image frame as follows: Referring back now to FIG. 8, it is recognized that it is possible to acquire an underlying HD image stream at 60-120 fps even with current consumer imaging technology, and faster acquisition rates are likely in the near term. Thus, in certain embodiments several full size images may be acquired in the same timeframe as a single frame of 30 fps video data. In certain embodiments, only a portion, 75% or less, and even as little as 50% or 30% or even 20% or less, or even 10%, of each full frame corresponding to the current ROI is processed by the geometric reconstruction engine. In these embodiments, several, nearly contemporaneous reconstructed image frames are obtained of a particular ROI. There may (very likely) be slight misalignments between such frames but as our intention is to enhance the lower quality regions of the ROI, such slight misalignments are, in fact, desirable.

Responsive to an indication from the face or other object detection/tracking subsystem, additional image frames are acquired in certain embodiments with a close temporal proximity to the original acquisition. Depending on the level of desired quality and the speed at which image frames can be acquired, at least 2, and even 4-8, or perhaps more, additional image frames may be obtained. After each acquisition the main image buffer may be cleared as in certain embodiments only the extracted ROI(s) are buffered.

Figure 7A:
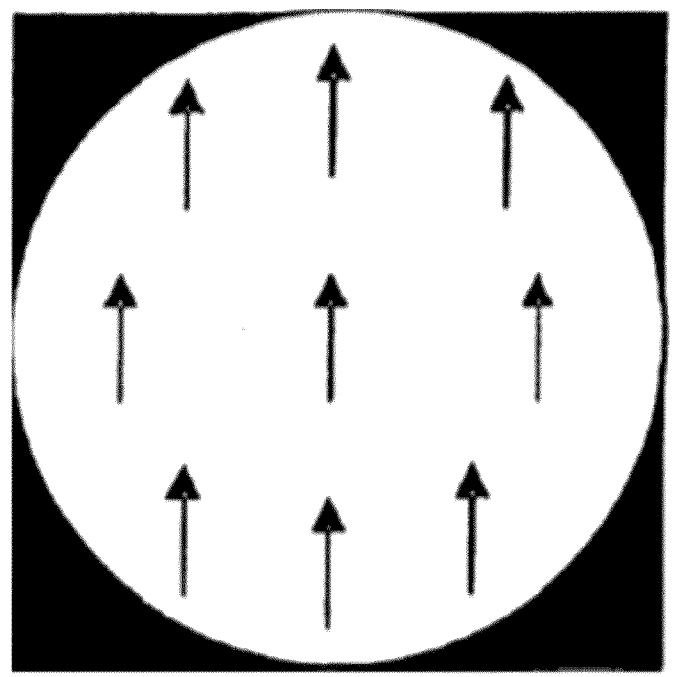
FIGS. 7(a) and 7(b) illustrate motion vectors arising from global motion are more emphasized towards the center of a typical non-linear lens (RHS), whereas they are uniform across a conventional (linear) lens.
Figure 7B:
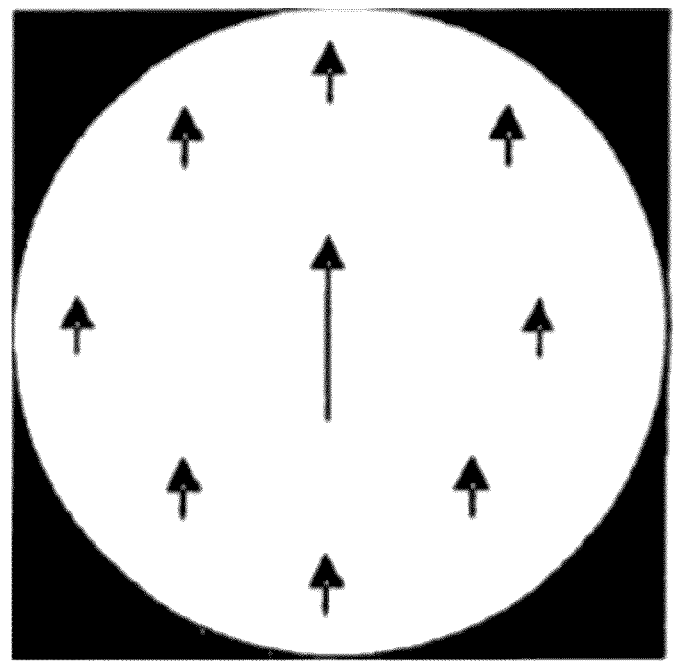

Super-resolution processing is then applied in certain embodiments to generate a single, enhanced output ROI for each sequence of extracted ROI(s). Referring to FIG. 7, as the peripheral regions of the main image are less sensitive to global image motion, motion compensation can be optionally performed or even avoided altogether. Any small motion effects will tend to improve the results from super-resolution processing as some offsets in alignment between the images are desired in advantageous embodiments involving application of one or more super-resolution techniques. After processing and enhancing relevant image region(s), additional face or other object detection and/or tracking may be performed using relatively smaller classifiers, e.g. 22×22 or 14×14.

Two Stage Face Tracking

In certain embodiments, geometric correction is applied to each ROI within a main acquired image prior to applying face or other object detection and/or tracking. A distorted scene may be "undistorted," in certain embodiments, and in other embodiments, distortion is actually applied to the face or other object classifiers, such that they may be applied to raw image data. In the latter embodiments, the resulting classifiers are non-rectangular. For the more non-linear regions towards the periphery of the image sensor, it becomes increasingly complicated to apply modified classifiers within a cascade in a consistent manner. Thus, the use of classifiers in these embodiments may be similar to or differ somewhat from the use of classifiers described in U.S. Ser. Nos. 12/959,089, 12/959,137, and 12/959,131, which belong to the same assignee and are incorporated by reference. These describe use of cylindrical and hybrid rectangular-cylindrical classifiers.

Now in order to transform standard rectangular classifiers of a particular size, say 32×32 pixels, it is advantageous in some embodiments to increase the size of face classifiers to, for example, 64×64. This larger size of classifier enables greater granularity, and thus improved accuracy, in transforming normal classifiers to distorted ones, particularly for the most distorted regions towards the periphery of the imaging sensor. The advantage is that preexisting classifier cascades can be re-used, rather than having to train new, distorted ones.

In certain embodiments, an initial, shortened chain of modified classifiers is applied to the raw image. This approach is particularly advantageous when it is not practical to perform a full face or other object detection on an uncorrected ROI. In this embodiment, an initial detection of likely face or other object regions is performed on the uncorrected raw image. Subsequently, in regions where a face is initially detected, the uncorrected ROI will be passed to the geometric correction engine and transformed into a rectangular frame-of-reference where further face or other object detection will be completed using a more straight-forward cascade of rectangular classifiers.

Figure 12:
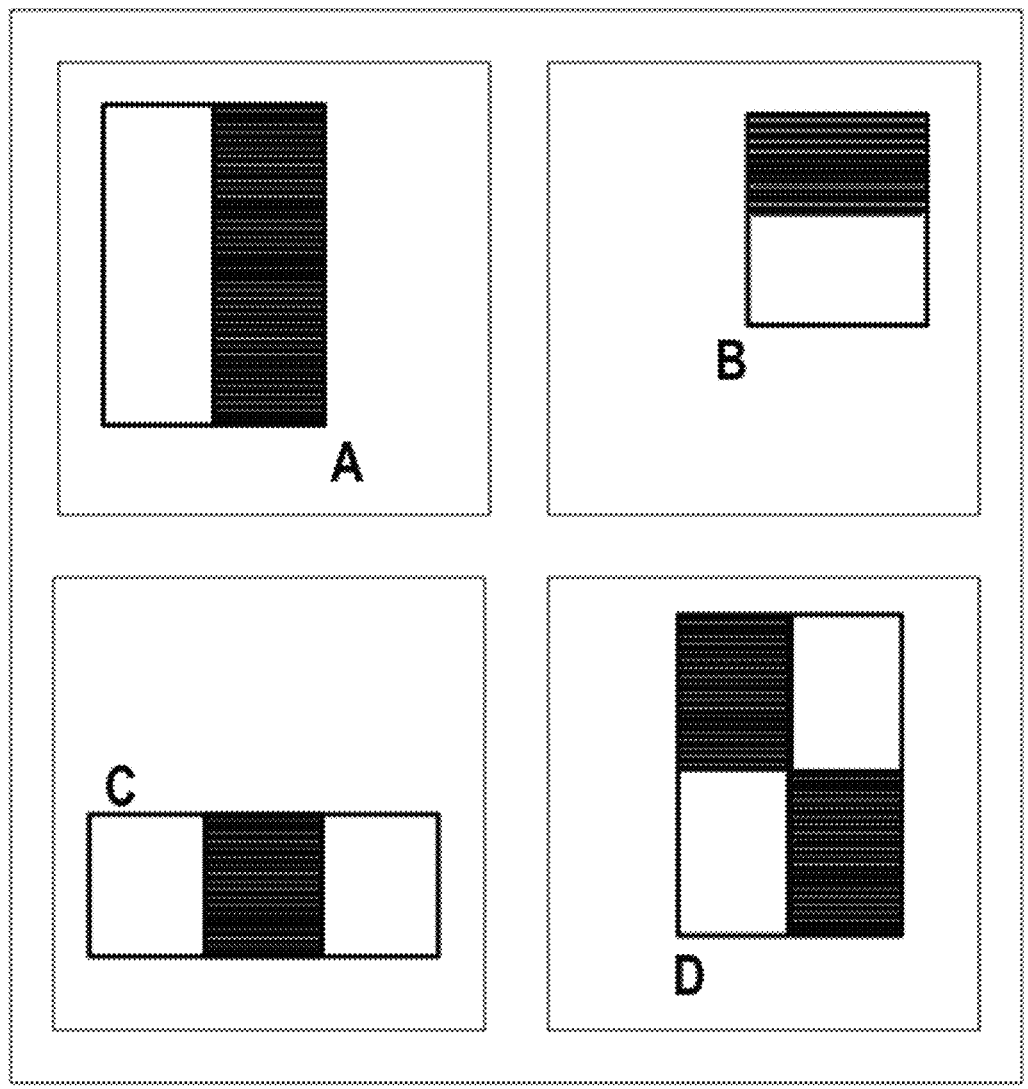
FIG. 12 illustrates the first four Haar classifiers.

A shortened, distorted classifier chain in accordance with certain embodiments may be composed of the first few face or other object classifiers from a normal face or other object detection chain. These initial classifiers may be the most aggressive to eliminate non-faces from consideration. These may also tend to be less complex in form, such as the first four Haar classifiers from the Viola-Jones cascade that are illustrated in FIG. 12. These may be implemented through a 22×22 pixel window in a practical embodiment). Further, it is advantageous in certain embodiments based on a knowledge of the location at which each classifier is to be applied and, optionally, the size of the detection window, to perform scaling of one or more classifiers dynamically. In certain embodiments, this is achieved using the geometric correction engine in reverse. Thus in these embodiments, the original classifiers may be stored together with data on the rectilinear scaling factors in horizontal and/or radial directions. In alternative embodiments, polar scaling factors may be employed. These can be achieved using a look-up table (LUT) which is specific to the lens used if the relevant transformations cannot be achieved using the geometric correction engine.

This short classifier chain is employed in certain embodiments to obtain a set of potential face regions which may then be re-mapped, using, for example, compressed rectilinear and/or cylindrical mapping, to enable the remainder of a complete face or other object detection classifier chain to be applied to each potential face or other object region. This embodiment is particularly advantageous when a large percentage, such as more than 95% or even more than 98% or 99%, or even 99.99%, of non-face or non-object regions may be eliminated by applying the first few face or other object classifiers. Thus, it is advantageous in certain embodiments to re-map a small number of potential face or other object regions, rather than the entire image scene, before applying a full face or other object detection process. This is approach is particularly useful in applications where it is only desired to transform and analyze the tracked face or other object region or regions, e.g., security applications. In certain embodiments, it is optional to correct or not correct portions of the image scene around a tracked individual or object, such that significant computational savings are achieved.

In certain embodiments, face classifiers are divided into symmetric and non-symmetric classifiers (see e.g., U.S. Ser. No. 61/417,737, incorporated by reference). In certain embodiments, it may be advantageous to use split classifier chains. For example, right and left-hand face or other object detector cascades may report detection of a half-face or other object region. This may be used to indicate that a full face is present, while the second half may be more or less distorted than would be expected, in one example because it may be closer to or farther from the lens than is normal. In such cases, more relaxed half- or full-face or other object detector may be employed to confirm whether a full face or other object is actually present and/or whether a lower acceptance threshold may be set for the current detector (see, e.g., U.S. Pat. No. 7,692,696, and US published applications nos. 2011/0050938, 2008/0219517 and 2008/0205712, and U.S. Ser. Nos. 13/020,805, 12/959,320, 12/825,280, 12/572,930, 12/824,204 and 12/944,701, which belong to the same assignee and are incorporated by reference).

In certain embodiments, the entire scene is not re-mapped, and instead only the luminance components are remapped and used to generate a geometrically undistorted integral image. Face or other object classifiers are then applied to this integral image in order to detect faces or other objects respectively. Once faces or other objects are detected those faces or other objects, with or without their surrounding peripheral regions, on each frame. In certain embodiments, it may be sufficient to re-map the entire scene background, which can be assumed in these embodiments to be static, only occasionally, say every 60-120 image frames. Image processing and enhancement is focused in certain embodiments on the people, faces or other objects of interest in the image scene. In alternative embodiments, to save computational resources, only one or more portions of the scene are re-mapped. In such embodiments, only the predicted face candidate areas, determined from one or more or several previous frames (see U.S. Pat. No. 7,460,695, incorporated by reference), may be transformed by the geometric correction engine, prior to applying a face or other object tracker to the region. In these embodiments, the entire main acquired image may be fully re-mapped at selected times in order to make an initial determination of new faces or other tracked objects within the entire image scene. After such initial determination, only the region immediately surrounding each detected face or other object is generally re-mapped.

In certain embodiments, when a face is tracked across the scene, it may be desired to draw particular attention to that face and to emphasize it against the main scene. In one exemplary embodiment, suitable for applications in video telephony, there may be one or more faces in the main scene, while one (or more!) of these may be speaking. In this case, a stereo microphone may be used to locate the speaking face. This face region, and optionally other foreground regions (e.g., neck, shoulders & torso, shirt, chair-back, and/or desktop) may be further processed to magnify them (e.g., by a factor of ×1.8 times) against the background. In certain embodiments, the magnified face may be composited onto the background image in the same location as the unmagnified original. In another embodiment, the other faces and the main background of the image are de-magnified and/or squeezed in order to keep the overall image size self-consistent. This may lead to some image distortion, particularly surrounding the "magnified" face. This can help to emphasize the person speaking (see, e.g., FIG. 4). In this case, the degree of magnification may be generally <×1.5 to avoid excessive distortion across the remainder of the image.

Embodiments have been described as including various operations. Many of the processes are described in their most basic form, but operations can be added to or deleted from any of the processes without departing from the scope of the invention.

The operations of the invention may be performed by hardware components or may be embodied in machine-executable instructions, which may be used to cause a general-purpose or special-purpose processor or logic circuits programmed with the instructions to perform the operations. Alternatively, the steps may be performed by a combination of hardware and software. The invention may be provided as a computer program product that may include a machine-readable medium having stored thereon instructions, which may be used to program a computer (or other electronic devices) to perform a process according to the invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the invention may also be downloaded as a computer program product, wherein the program may be transferred from a remote computer to a requesting computer by way of data signals embodied in a carrier wave or other propagation medium via a communication cell (e.g., a modem or network connection). All operations may be performed at the same central site or, alternatively, one or more operations may be performed elsewhere.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention.

In addition, in methods that may be performed according to preferred embodiments herein and that may have been described above, the operations have been described in selected typographical sequences. However, the sequences have been selected and so ordered for typographical convenience and are not intended to imply any particular order for performing the operations, except for those where a particular order may be expressly set forth or where those of ordinary skill in the art may deem a particular order to be necessary.

In addition, all references cited above and below herein, as well as the background, invention summary, abstract and brief description of the drawings, are all incorporated by reference into the detailed description of the preferred embodiments as disclosing alternative embodiments.

What is claimed is:

1. Within an image acquisition system comprising a non-linear, wide-angled lens and an imaging sensor, a method of enhancing a scene containing one or more off-center peripheral regions, the method comprising:
   acquiring, using the non-linear, wide-angled lens and the imaging sensor, an initial distorted image with a large field of view;
   determining and extracting an off-center region of interest (hereinafter "ROI") within said initial distorted image;
   wherein the ROI includes a portion from said initial distorted image that has uncorrected distortion;
   applying an initial object detection process to said off-center ROI that includes the portion from said initial distorted image having uncorrected distortion;

responsive to the initial object detection process successfully detecting an object within the off-center ROI:
applying geometric correction to remove distortion from the off-center ROI to produce a undistorted reconstructed ROI, without applying the geometric correction to said entire initial distorted image;
applying a second object detection process to one or more regions within the undistorted reconstructed ROI;
wherein the second object detection process is different than the initial object detection process.

2. A method as in claim 1, further comprising compensating for global motion of the imaging device.

3. A method as in claim 1, further comprising performing an action based on a location of the object tracked within the undistorted reconstructed ROI.

4. A method as in claim 1, further comprising determining a quality of reconstructed pixels within said undistorted reconstructed ROI; and selectively applying image analysis to said undistorted reconstructed ROI based on the quality of the reconstructed pixels.

5. A method as in claim 4, further comprising responsive to said image analysis and said quality of reconstructed pixels, selectively applying image enhancement and generating an enhanced output image.

6. A method as in claim 1, further comprising determining if any undetected faces below a size threshold are likely to exist in one or more reduced quality regions of the undistorted reconstructed ROI.

7. A method as in claim 6, further comprising, responsive to said determining if any undetected faces exist, acquiring one or more additional initial distorted images, extracting and reconstructing one or more matching ROIs, and combining said one or more matching ROIs with reduced quality pixels of the original reconstructed ROI using a super-resolution technique, and generating, based on the combining, one or more enhanced ROIs.

8. A method as in claim 7, further comprising applying additional face detecting or tracking, or both, to the one or more enhanced ROIs to confirm a presence and location of a face below an original size threshold.

9. A digital image acquisition device, comprising:
a non-linear, wide-angled lens and an imaging sensor configured to capture digital images of scenes containing one or more off-center peripheral regions, including an initial distorted image with a large field of view;
a processor; a memory having code embedded therein for programming the processor to perform a method of enhancing a scene containing one or more off-center peripheral regions, wherein the method comprises:
acquiring, using the non-linear, wide-angled lens and the imaging sensor, an initial distorted image with a large field of view;
determining and extracting an off-center region of interest (hereinafter "ROI") within said initial distorted image;
wherein the ROI includes a portion from said initial distorted image that has uncorrected distortion;
applying an initial object detection process to said off-center ROI that includes the portion from said initial distorted image having uncorrected distortion
responsive to the initial object detection process successfully detecting an object within the off-center ROI:
applying geometric correction to remove distortion from the off-center ROI to produce a undistorted reconstructed ROI, without applying the geometric correction to said entire initial distorted image;
applying a second object detection process to one or more regions within the undistorted reconstructed ROI;
wherein the second object detection process is different than the initial object detection process.

10. A device as in claim 9, wherein the method further comprises compensating for global motion of the imaging device.

11. A device as in claim 9, wherein the method further comprises performing an action based on a location of the object tracked within the first reconstructed ROI.

12. A device as in claim 9, wherein the method further comprises determining a quality of reconstructed pixels within said first reconstructed ROI; and selectively applying image analysis to said reconstructed ROI based on the quality of the reconstructed pixels.

13. A device as in claim 12, wherein the method further comprises responsive to said image analysis and said quality of reconstructed pixels, selectively applying image enhancement and generating an enhanced output image.

14. A device as in claim 9, wherein the method further comprises determining if any undetected faces below a size threshold are likely to exist in one or more reduced quality regions of the reconstructed ROI.

15. A device as in claim 14, wherein the method further comprises, responsive to said determining if any undetected faces exist, acquiring one or more additional initial distorted images, extracting and reconstructing one or more matching ROIs, and combining said one or more matching ROIs with reduced quality pixels of the original reconstructed ROI using a super-resolution technique, and generating, based on the combining, one or more enhanced ROIs.

16. A device as in claim 15, wherein the method further comprises applying additional face detecting or tracking, or both, to the one or more enhanced ROIs to confirm a presence and location of a face below an original size threshold.

17. One or more non-transitory, processor-readable storage media having code embedded therein for programming a processor to perform a method of enhancing a scene captured with a non-linear, wide-angled lens and containing one or more off-center peripheral regions, wherein the method comprises:
determining and extracting an off-center region of interest (hereinafter "ROI") within an initial distorted image;
wherein the ROI includes a portion from said initial distorted image that has uncorrected distortion;
applying an initial object detection process to said off-center ROI that includes the portion from said initial distorted image having uncorrected distortion;
responsive to the initial object detection process successfully detecting an object within the off-center ROI:
applying geometric correction to remove distortion from the off-center ROI to produce a undistorted reconstructed ROI, without applying the geometric correction to said entire initial distorted image;
applying a second object detection process to one or more regions within the undistorted reconstructed ROI;
wherein the second object detection process is different than the initial object detection process.

18. One or more non-transitory, processor-readable storage media as in claim 17, wherein the method further comprises compensating for global motion of the imaging device.

19. One or more non-transitory, processor-readable storage media as in claim 17, wherein the method further comprises performing an action based on a location of the object tracked within the first reconstructed ROI.

20. One or more non-transitory, processor-readable storage media as in claim 17, wherein the method further comprises determining a quality of reconstructed pixels within said first reconstructed ROI; and selectively applying image analysis to said reconstructed ROI based on the quality of the reconstructed pixels.

21. One or more non-transitory, processor-readable storage media as in claim 20, the method further comprises responsive to said image analysis and said quality of reconstructed pixels, selectively applying image enhancement and generating an enhanced output image.

22. One or more non-transitory, processor-readable storage media as in claim 17, wherein the method further comprises determining if any undetected faces below a size threshold are likely to exist in one or more reduced quality regions of the reconstructed ROI.

23. One or more non-transitory, processor-readable storage media as in claim 22, wherein the method further comprises, responsive to said determining if any undetected faces exist, acquiring one or more additional initial distorted images, extracting and reconstructing one or more matching ROIs, and combining said one or more matching ROIs with reduced quality pixels of the original reconstructed ROI using a super-resolution technique, and generating, based on the combining, one or more enhanced ROIs.

24. One or more non-transitory, processor-readable storage media as in claim 23, wherein the method further comprises applying additional face detecting or tracking, or both, to the one or more enhanced ROIs to confirm a presence and location of a face below an original size threshold.

* * * * *